United States Patent
Zhang et al.

(10) Patent No.: US 11,954,173 B2
(45) Date of Patent: Apr. 9, 2024

(54) DATA PROCESSING METHOD, ELECTRONIC DEVICE AND COMPUTER PROGRAM PRODUCT

(71) Applicant: EMC IP Holding Company LLC, Hopkinton, MA (US)

(72) Inventors: Yuting Zhang, Chengdu (CN); Kaikai Jia, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 300 days.

(21) Appl. No.: 17/219,647

(22) Filed: Mar. 31, 2021

(65) Prior Publication Data

US 2022/0237409 A1 Jul. 28, 2022

(30) Foreign Application Priority Data

Jan. 22, 2021 (CN) .......................... 202110090371.3

(51) Int. Cl.
*G06F 18/214* (2023.01)
*G06F 18/231* (2023.01)
(Continued)

(52) U.S. Cl.
CPC .......... *G06F 18/214* (2023.01); *G06F 18/231* (2023.01); *G06F 40/295* (2020.01); *G06F 40/30* (2020.01); *G06V 30/414* (2022.01)

(58) Field of Classification Search
CPC ............... G06K 9/6256; G06K 9/6219; G06K 9/00463; G06F 40/30; G06F 40/295
See application file for complete search history.

(56) References Cited

U.S. PATENT DOCUMENTS

2009/0281970 A1* 11/2009 Mika ..................... G06F 40/169
706/12
2011/0282890 A1* 11/2011 Griffith ............. G06F 16/24573
707/758
(Continued)

FOREIGN PATENT DOCUMENTS

CN 114818705 A 7/2022

OTHER PUBLICATIONS

Data re-identification. (Jan. 15, 2021). Wikipedia. Retrieved Jan. 27, 2022, from https://en.wikipedia.org/w/index.php?title=Data_re-identification&oldid=1000449694.
(Continued)

*Primary Examiner* — Kevin Ky
(74) *Attorney, Agent, or Firm* — Chamberlain, Hrdlicka, White, Williams & Aughtry; Aly Z. Dossa (57) ABSTRACT

A method, an electronic device, and a computer program product for processing data is disclosed. The method includes training a classification model based on a plurality of reference documents describing different objects, the trained classification model respectively associating the plurality of reference documents with the described objects. The method further includes determining from the individual words identification information that can identify the objects based on contributions of individual words in the reference documents to the association. Identification information that can identify objects in documents describing the objects may be determined, so that an identification information data set is automatically generated for training a machine learning model that is used to determine the identification information.

18 Claims, 6 Drawing Sheets

(51) Int. Cl.
*G06F 40/295* (2020.01)
*G06F 40/30* (2020.01)
*G06V 30/414* (2022.01)

(56) References Cited

U.S. PATENT DOCUMENTS

| | | |
|---|---|---|
| 2018/0217980 A1* | 8/2018 | Baron-Palucka ....... G06F 40/30 |
| 2020/0012670 A1* | 1/2020 | Heckmann .............. G06F 9/453 |
| 2020/0334416 A1* | 10/2020 | Vianu .................. G06V 10/764 |
| 2020/0364404 A1* | 11/2020 | Priestas ............ G06V 30/19173 |
| 2022/0076007 A1* | 3/2022 | Rout ...................... G06V 20/20 |
| 2022/0108073 A1* | 4/2022 | Menon ................ G06F 18/2193 |
| 2023/0022673 A1* | 1/2023 | Derzsy .................. G06N 5/022 |
| 2023/0047800 A1* | 2/2023 | Suryanarayanan ... G06F 16/254 |
| 2023/0060459 A1* | 3/2023 | Wang ..................... G06V 10/75 |
| 2023/0082729 A1* | 3/2023 | Religa ................... G06N 3/045 |
| | | 715/230 |

OTHER PUBLICATIONS

De-identification. (Dec. 8, 2020). Wikipedia. Retrieved Jan. 27, 2022, from https://en.wikipedia.org/w/index.php?title=De-identification&oldid=992960654.

Wikipedia Biography dataset. (Sep. 23, 2016). GitHub, Inc. Retrieved Jan. 27, 2022, from https://github.com/DavidGrangier/wikipedia-biography-dataset.

\* cited by examiner

United States Patent US 11,954,173 B2

DATA PROCESSING METHOD, ELECTRONIC DEVICE AND COMPUTER PROGRAM PRODUCT

CROSS REFERENCE TO RELATED APPLICATION

This application claims priority under 35 U.S.C. § 119 to Chinese Patent Application No. 202110090371.3, filed on Jan. 22, 2021. The contents of Chinese Patent Application No. 202110090371.3 are incorporated by reference in its entirety.

TECHNICAL FIELD

Embodiments of the present disclosure relate to the field of data processing, and particularly, to a method, an electronic device, and a computer program product for determining identification information.

BACKGROUND

With the advent of the big data era, the problem of personal privacy leakage has become more and more serious. Therefore, the importance of detecting and determining personal privacy data in data and protecting it has become increasingly significant. In the "General Data Protection Regulation" promulgated by the European Union, the concept of Personally Identifiable Information (PII) was introduced. PII is defined as information that can identify a natural person, such as the natural person's name, ID number, location data, and identifiers specific to the natural person's physical, physiological, genetic, economic, and social factors. At present, there is an urgent need for methods that can determine, detect, and collect PII in the field of data processing.

SUMMARY OF THE INVENTION

The embodiments of the present disclosure provide a data processing solution.

In a first aspect of the present disclosure, a data processing method is provided. The method includes: training a classification model based on a plurality of reference documents describing different objects, the trained classification model respectively associating the plurality of reference documents with the described objects. The method further includes: based on contributions of individual words in the reference documents to the association, determining from the individual words identification information that can identify the objects.

In a second aspect of the present disclosure, an electronic device is provided. The electronic device includes a processor and a memory that is coupled to the processor and has instructions stored therein. The instructions, when executed by the processor, cause the device to execute actions. The actions include: training a classification model based on a plurality of reference documents describing different objects, the trained classification model respectively associating the plurality of reference documents with the described objects. The actions further include: based on contributions of individual words in the reference documents to the association, determining from the individual words identification information that can identify the objects.

In a third aspect of the present disclosure, a computer program product is provided. The computer program product is tangibly stored on a computer-readable medium and includes machine-executable instructions. The machine-executable instructions, when executed, cause a machine to perform the method according to the first aspect.

In the embodiments of the present disclosure, through a data processing solution of the present disclosure, identification information that can identify objects in documents describing the objects may be determined, so that an identification information data set is automatically generated for training a machine learning model that is used to determine the identification information.

The Summary of the Invention section is provided in order to introduce the selection of concepts in a simplified form, which will be further described in the Detailed Description below. The Summary of the Invention section is neither intended to identify key features or main features of the embodiments of the present disclosure, nor intended to limit the scope of the present disclosure.

BRIEF DESCRIPTION OF THE DRAWINGS

The above and other objectives, features, and advantages of embodiments of the present disclosure will become more apparent by describing example embodiments of the present disclosure in more detail in combination with the accompanying drawings. In the example embodiments of the present disclosure, the same reference numerals generally represent the same parts.

DETAILED DESCRIPTION

The principles of the embodiments of the present disclosure will be described below with reference to several example embodiments shown in the accompanying drawings. Although preferred embodiments of the present disclosure are exemplified in the accompanying drawings, it should be understood that these embodiments are described only to enable those skilled in the art to better understand and then implement the embodiments of the present disclosure, and are not intended to impose any limitation to the scope of the present disclosure.

The term "include" and variants thereof used herein indicate open-ended inclusion, that is, "including but not limited to." Unless specifically stated, the term "or" means "and/or." The term "based on" means "based at least in part on" The terms "an example embodiment" and "some embodiments" mean "at least one example embodiment." The term "another embodiment" means "at least one further embodiment." The terms "first," "second," and the like may refer to different or the same objects. Other explicit and implicit definitions may also be included below.

The term "object" as used herein may include "an individual," "an organization," and the like. The term "identification information" as used herein may include "personally identifiable information" or "PII." PII may include personal privacy data that can identify a specific individual, such as name, ID number, and work experience. PII may be classified into direct PII and indirect PII. The direct PII may be used to directly identify a specific individual. Examples of the direct PII may include name, phone number, ID number, and the like. The indirect PII may be related to activities of a specific individual. For example, examples of the indirect PII may include the individual's medical history, criminal record, work experience, and the like. The terms "PII determination" and "determine PII" as used herein may include "PII recognition" and "recognize PII."

As mentioned above, the determination, collection, storage, and processing of PII are functions that are much required in the data field. Currently, most PII determination methods may only determine the direct PII in data. For example, the direct PII such as ID number and phone number may be determined in the data through a pattern matching method. This is because the ID number and the phone number have specific data patterns and are therefore easy to be determined. However, most indirect PII does not have a specific data pattern, and is therefore difficult to determine.

As an example, if PII is removed from a Steve Job's autobiographical document using existing PII determination methods, all direct PII such as name, location, ID, date of birth, and email will no longer exist. However, there will still be many pieces of information in the document that are not closely related to Jobs. When these pieces are combined together, people can still determine that the entire document describes the founder of Apple Inc. based on Steve Job's personal work experience, famous quotes, product design stories, and the like. Therefore, an improved method that can determine the indirect PII in the document is required.

Named entity recognition (NER) may partially achieve determination of the direct PII and the indirect PII. NER is an information extraction method of a natural language processing (NLP) technology. NER may locate entities in an unstructured or semi-structured text. These entities may be various things, for example, they may be a specific individual or a very specific thing. For example, NER may extract a text containing PII and mark it as a specific label (such as person, address, and the like).

NER used for PII recognition usually includes ontology-based NER and deep learning NER using a PII data set. The ontology-based NER requires a knowledge base. The knowledge base is called an ontology and contains words, terms, and their relationships. The ontology-based NER is a method based on regular expressions, which is good at recognizing known terms and concepts in the unstructured or semi-structured text with specific patterns, but strongly relies on the update of the ontology.

The deep learning NER is more accurate than the aforementioned ontology-based NER. This is because the deep learning NER may achieve word clustering by using a word embedding technology. By using the word embedding technology, words with similar semantic and grammatical relationships may be clustered together. In addition, the deep learning NER may recognize terms and concepts that do not appear in the ontology, which makes the deep learning NER have a strong generalization ability.

However, the deep learning NER is a supervised machine learning algorithm that requires a training data set. The training data set is required to include determined, marked, or labeled PII. Currently, the training data set of the deep learning NER used for PII recognition includes a general data set such as CoNLL 2003, OntoNotes 5.0/CoNLL 2012, and I2b2 Challenges. In these data sets, some entities or words in a document are marked as specific labels. Examples of the labels may include: name, organization, geographic location, activity, product, time indication, and the like. It can be seen that, although the general data set may provide labelled text content, the general data set only includes a limited number of label categories, and many of them are not related to PII. For example, the labels such as product and time indication may not be related to PII. Therefore, the deep learning NER trained based on the general data set can only recognize a limited number of predefined PII, and it is difficult to recognize undefined PII, especially indirect PII.

The embodiments of the present disclosure propose a data processing solution to solve at least the above problem or one or more of other potential problems. In this solution, a classification model is trained based on a plurality of reference documents describing different objects, and the trained classification model respectively associates the plurality of reference documents with the described objects. Then, based on contributions of individual words in the reference documents to the association, identification information that can identify the objects is determined from the individual words.

In this way, the solution can determine the identification information in the reference documents, thereby automatically generating an identification information data set without manually labeling the identification information. Therefore, a lot of time and resources may be saved. In addition, in this solution, by determining a specific word as the identification information based on the contributions of the words in the documents to the association of the documents with the corresponding objects, potential identification information may be determined. For example, in the case where the objects are individuals, this solution may determine potential indirect PII based on the context. This is because when manually labeling PII, some words or sentences that can indirectly identify an individual may be omitted. Therefore, the deep learning NER trained based on the general data set of manually labeled PII may not be able to recognize these types of indirect PII.

In contrast, in this solution, by training the classification model that associates the reference documents with the corresponding individuals, a contribution of each word in the documents to the identified individual may be determined according to the trained classification model. By determining the words that have great contributions to the previous association between the documents and the individual as PII, the potential indirect PII may be determined as much as possible. In addition, by adjusting a contribution threshold, PII data sets of different quality may be generated. For example, if the contribution threshold is large, only words that make a great contribution to the association can be determined as PII, so the generated PII data set has a higher quality.

Basic principles and several example implementations of the present disclosure are illustrated below with reference to FIG. 1 to FIG. 5. It should be understood that these example embodiments are provided only to enable those skilled in the art to better understand and then implement the embodiments of the present disclosure, and not to limit the scope of the present disclosure in any way.

Figure 1:
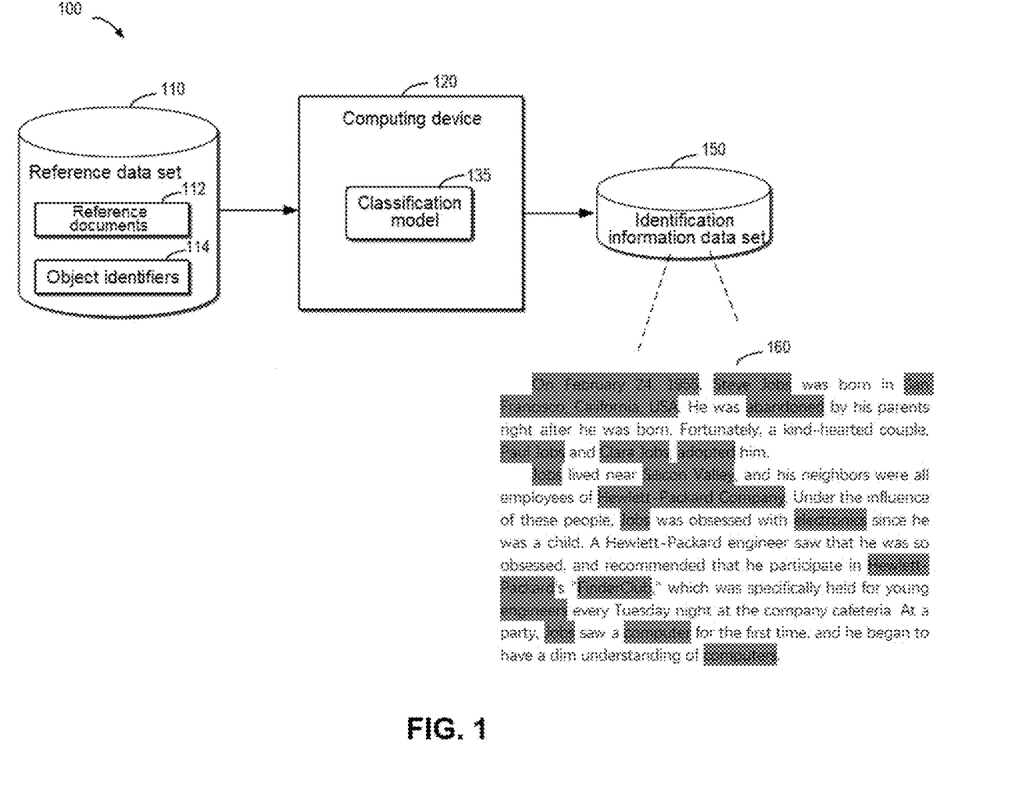
FIG. 1 shows a schematic diagram of an environment in which one or more embodiments may be implemented.

FIG. 1 shows example environment 100 in which embodiments of the present disclosure can be implemented. As shown in FIG. 1, environment 100 includes reference data set 110, computing device 120, and identification information data set 150. Classification model 135 is deployed in computing device 120. Computing device 120 includes computing device 120 in the form of a general-purpose computing device. In some implementations, computing device 120 may be implemented as various user terminals or service terminals having computing capabilities. The service terminals may be servers, large-scale computing devices, and the like provided by various service providers. For example, the user terminals may be any type of mobile, fixed, or portable terminals, including a mobile phone, a site, a unit, a device, a multimedia computer, a multimedia tablet, an Internet node, a communicator, a desktop computer, a laptop computer, a notebook computer, a netbook computer, a tablet computer, a personal communication system (PCS) device, a personal navigation device, a personal digital assistant (PDA), an audio/video player, a digital camera/camcorder, a positioning device, a television receiver, a radio broadcast receiver, an e-book device, a gaming device, or any combination thereof, including accessories and peripherals of such devices, or any combination thereof.

Components of computing device 120 may include, but are not limited to, one or more processors or processing units, memories, storage devices, one or more communication units, one or more input devices, and one or more output devices. These components may be integrated on a single device or provided in the form of a cloud computing architecture. In the cloud computing architecture, these components may be remotely arranged and may work together to achieve the functions described in the present disclosure. In some implementations, cloud computing provides computing, software, data access, and storage services, which do not require terminal users to know physical locations or configurations of systems or hardware that provide these services. In various implementations, the cloud computing uses an appropriate protocol to provide services through a wide area network (such as the Internet). For example, a cloud computing provider provides applications through the wide area network, and the applications are accessible through a web browser or any other computing components. Software or components of the cloud computing architecture and corresponding data may be stored on a server at a remote location. Computing resources in a cloud computing environment may be merged at a remote data center location, or they may be dispersed. Cloud computing infrastructures may provide services through a shared data center, even if they are each represented as a single point of access for users. Therefore, the components and functions described herein may be provided from a service provider at a remote location by using the cloud computing architecture. Alternatively, they may also be provided from a conventional server, or they may be installed on a client terminal device directly or in other manners.

Computing device 120 may be used to implement the data processing method according to the embodiments of the present disclosure. As shown in FIG. 1, computing device 120 receives reference data set 110. Computing device 120 may receive reference data set 110 from other computing devices or storage devices through its input device. Reference data set 110 may have a plurality of pairs composed of reference documents 112 describing objects and object identifiers 114 of the described objects corresponding thereto. In the case where the objects are individuals, examples of reference documents 112 describing the individuals may include biographies, medical records, resumes, bills, criminal records, and the like. Object identifiers 114 may be personal identifiers. The personal identifiers may include an individual's name, ID number, mailbox, and the like. For example, reference documents 112 may be a biography of Steve Jobs, the founder of Apple Inc., and the corresponding personal identifier is the name Steve Jobs. In the case where the objects are organizations, examples of reference documents 112 describing the objects may include a brief history of a company, a school history, and the like. Examples of corresponding object identifiers 114 may include organization name, organization code, and the like.

Computing device 120 may use reference data set 110 to train classification model 135 deployed in computing device 120. Classification model 135 may be a machine learning model configured to associate a document describing an object with the described object. For example, classification model 135 may be a Hierarchical Attention Network (HAN). The HAN is a commonly used machine learning model using an attention mechanism for text classification. After being trained, classification model 135 may be used to generate identification information data set 150 based on reference documents 112 in reference data set 110. The content of this aspect will be described in detail below with reference to FIG. 2 to FIG. 4.

The generated identification information data set 150 may be composed of reference documents 112 including the determined identification information. For example, one example of reference documents 112 including the determined identification information is document 160 shown in FIG. 1. Document 160 is a description about Steve Jobs. Document 160 includes a number of words determined as PII shown in gray background, for example, "Feb. 24, 1995," "Steve Jobs," "San Francisco, California, USA," and "computer." It should be understood that whether a word can be determined as PII depends on the context. For example, in this description about Steve Jobs, "computer" may be determined as the PII, and in a document describing Su Dongpo, even if "computer" appears, "computer" may not be determined as the PII.

It should be understood that environment 100 shown in FIG. 1 is merely an example and should not constitute any limitation to the functions and scope of the implementations described in the present disclosure. For example, computing device 120 may also receive reference data set 110 from a storage device integrated therewith. Computing device 120 may also store the generated PII data set 150 in a storage device integrated therewith.

Figure 2:
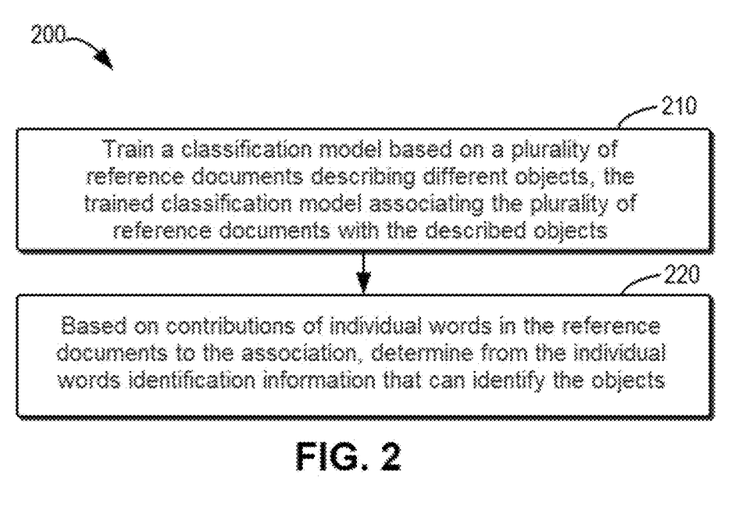
FIG. 2 shows a flowchart of a method for determining identification information according to one or more embodiments of the present disclosure.

FIG. 2 shows a flowchart of example method 200 for data processing according to one or more embodiments of the present disclosure. For example, method 200 may be performed by computing device 120 as shown in FIG. 1. It should be understood that method 200 may also include additional actions not shown and/or may omit actions shown, and the scope of the present disclosure is not limited in this regard. Method 200 is described in detail below in conjunction with FIG. 1.

At block 210, classification model 135 is trained based on a plurality of reference documents 112 describing different objects. The trained classification model respectively associates the plurality of reference documents 112 with the described objects. In one or more embodiments, reference documents 112 may include at least one of biographies, medical records, resumes, bills, or criminal records. For example, reference documents 112 may be a biography describing Steve Jobs, or may be a criminal record of Jack the Ripper, the notorious British murderer. In one or more embodiments, the plurality of reference documents 112 describing different individuals may be acquired from the publicly available Wikipedia biography data set to train classification model 135. In one or more embodiments, the plurality of reference documents 112 describing different individuals have respective personal identifiers of the different individuals described. In this case, respectively associating the plurality of reference documents 112 with the described objects may include associating the plurality of reference documents 112 with corresponding personal identifiers. Examples of the personal identifiers may include name, phone number, mailbox, and the like. For example, reference document 112 describing Steve Jobs may have a corresponding personal identifier "Steve Jobs."

Classification model 135 is trained to respectively associate the plurality of reference documents 112 with the described objects. In one or more embodiments, respectively associating the plurality of reference documents 112 with the described objects may include respectively associating the plurality of reference documents 112 with corresponding object identifiers 114. As described above, classification model 135 may be an HAN with an attention mechanism. The HAN may be trained based on a plurality of pairs, composed of reference documents 112 and corresponding object identifiers 114, as an input data set. The trained HAN may associate reference documents 112 with object identifiers 114 corresponding thereto. For example, the trained HAN may associate reference document 112 describing Steve Jobs with Steve Jobs instead of Bill Gates. The details of training classification model 135 will be described below with reference to FIG. 3.

Figure 3:
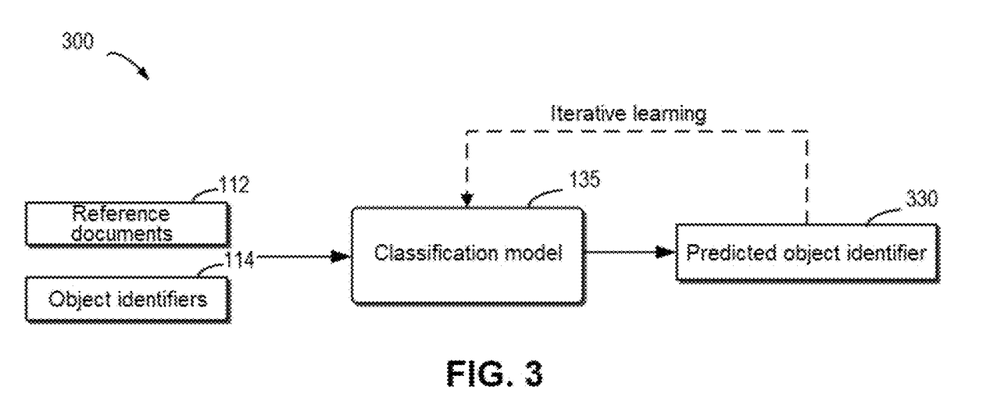
FIG. 3 shows a schematic diagram of training a classification model according to one or more embodiments of the present disclosure.

FIG. 3 shows schematic diagram 300 of training classification model 135 according to one or more embodiments of the present disclosure. A process described with reference to FIG. 3 may be considered as a specific implementation of block 210. As shown in FIG. 3, a plurality of reference documents 112 describing different objects and their respective object identifiers 114 may be used to train classification model 135. When training classification model 135, input data may be a plurality of key-value pairs composed of reference documents 112 and corresponding object identifiers 114. A conventional training method can be used to train classification model 135, that is, a difference between object identifiers 330 predicted by classification model 135 and object identifiers 114 in the input data can be minimized through iterative training, thereby determining model parameters that associate reference documents 112 with object identifiers 114 corresponding thereto.

Classification model 135 may be a classification model with an attention mechanism, such as an HAN. Classification model 135 with the attention mechanism may update an attention weight assigned to each individual word in the documents during training, so as to learn which words in the documents have great contributions to the association. The scope of the present disclosure is not limited in terms of the specific architecture and training details of classification model 135. Any classification model 135 that can associate the reference documents with the corresponding objects and learn the contributions of the words in the documents to the association may be used.

Continuing to refer to FIG. 2, at block 220, based on the contributions of the individual words in reference documents 112 to the association, identification information that can identify the objects is determined from the individual words. The individual words may be each word in reference documents 112, or a word after word segmentation. For example, examples of the individual words may include "of," "work," "Steve Jobs," and the like. As described above, classification model 135 is trained to associate a plurality of reference documents 112 with the described objects corresponding thereto. Therefore, classification model 135, through training, learns a contribution of each word in reference documents 112 to the association between reference documents 112 and the corresponding objects. In other words, classification model 135, through training, learns which words in reference documents 112 are more helpful to identify the corresponding objects. For example, after the training is completed, classification model 135 can learn that the word "apple" has a great contribution to the association of reference document 112 describing Steve Jobs with Steve Jobs, while the word "work" has a small contribution to the association. In this case, the word "apple" may be determined as the PII for reference document 112, and the word "work" may not be determined as the PII. The details of determining the PII in reference documents 112 based on the contributions of the words to the association will be described below with reference to FIG. 4.

Figure 4:
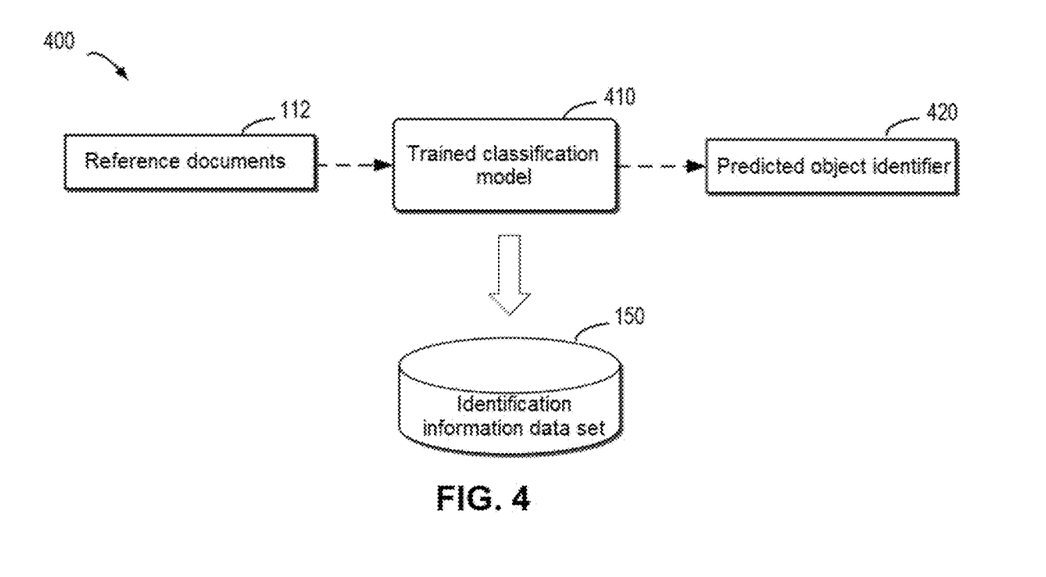
FIG. 4 shows a schematic diagram of using the trained classification model to generate an identification information data set according to one or more embodiments of the present disclosure.

FIG. 4 shows schematic diagram 400 of using the trained classification model 410 to generate identification information data set 150 according to one or more embodiments of the present disclosure. FIG. 4 shows the trained classification model 410. The trained classification model 410 refers to classification model 135 after the training is completed. The completion of the training may mean that the classification effect of the trained classification model has been higher than a predetermined value. For example, if the classification accuracy of classification model 135 reaches 99.99%, it could be considered that the training of classification model 135 is completed. In one or more embodiments, after the training is completed, a weight assigned to each individual word in reference documents 112 by the trained classification model 410 may be determined, and the word whose weight exceeds a threshold can be determined as identification information. The weight may be an attention weight indicating a contribution of the word to the association. For example, the most recently updated attention weight may be extracted from the trained classification model 410, and the corresponding word whose attention weight exceeding the threshold may be determined as identification information. It should be understood that the trained classification model 410 may store an attention weight for each word in each reference document 112 of a plurality of reference documents 112 as input. Therefore, after the training is completed, the identification information in specific reference document 112 may be directly determined based on the attention weight assigned to each word in the model.

Alternatively, in one or more embodiments, reference documents 112 in batches are considered to be used to train classification model 135. Since only a part of reference documents 112 is used to train classification model 135 each time, the trained classification model 410 can only store the weights of the individual words in a part of reference documents of reference documents 112. Therefore, it is possible to obtain only a part of reference documents 112 including the determined identification information. In this case, reference documents 112 in a training data set of the previous batch may be input into the trained classification model 410 again. When the trained classification model 410 associates these reference documents 112 with the described objects, the individual words in reference documents 112 are assigned with attention weights. Then, a word whose attention weight exceeds a threshold may be determined as identification information.

On this basis, reference documents 112 including the determined identification information may be formed into identification information data set 150. For example, identification information data set 150 may be composed of a plurality of documents 160 as shown in FIG. 1. As shown in FIG. 1, document 160 contains information about whether each word is determined as identification information. The words determined as identification information are shown in gray background. In one or more embodiments, a part of reference documents 112 including the determined identification information may be selected to form identification information data set 150. For example, reference documents 112 that include more identification information may be selected to form identification information data set 150.

In this way, identification information data set 150 may be automatically generated by extracting the learned attention information from the trained classification model 410. This method of automatically generating identification information data set 150 can save a lot of manpower and time resources. For example, by extracting attention weights indicating the contributions of words in reference documents 112 to the association from the trained classification model 410, and determining specific words whose weights are greater than a threshold as identification information that can identify the objects, identification information data set 150 may be automatically generated. Therefore, in the embodiments of the present disclosure, identification information data set 150 may be automatically generated using public texts such as the Wikipedia biography data set without manual labeling. In addition, as described above, the identification information is determined based on the contributions of the words to the association, so that indirect PII may also be identified without being missed, which may solve the problem of possible omissions during manual labeling of PII.

The generated identification information data set 150 may be used to train an NER model, so as to cause the trained NER model to determine identification information in a target document. The following describes in detail with reference to FIG. 5 a process of using the generated identification information data set 150 to train the NER model and using the trained NER model to determine the identification information in the target document.

Figure 5:
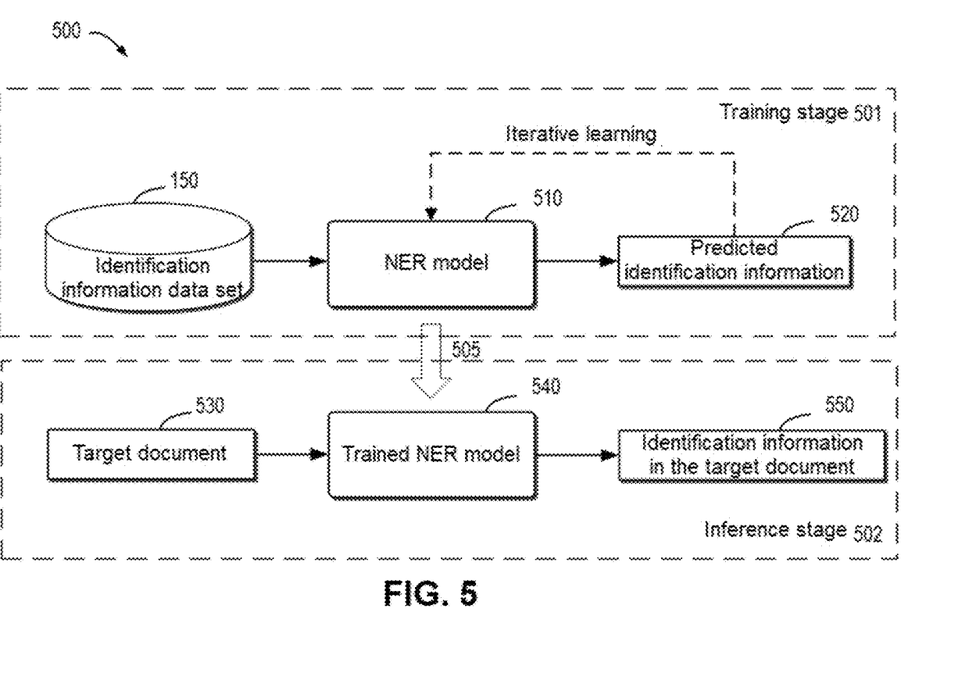
FIG. 5 shows a schematic diagram of training a named entity recognition model based on an identification information data set and using the trained named entity recognition model to determine identification information in a target document according to one or more embodiments of the present disclosure.

FIG. 5 shows schematic diagram 500 of using identification information data set 150 to train an NER model and using the trained NER model to determine PII in a target document according to one or more embodiments of the present disclosure. FIG. 5 shows identification information data set 150, NER model 510, target document 530, and trained NER model 540.

First, training stage 501 of training NER model 510 using identification information data set 150 is described. NER model 510 may be the above-mentioned deep learning NER model for determining identification information in a document. For example, NER model 510 may be a long-short term memory model using a conditional random field (CRF+ LSTM). The process of training NER model 510 is similar to that of training classification model 135, due to the fact that NER model 510 and classification model 135 are both supervised machine learning models. For example, the generated identification information data set 150 described in FIG. 4 may be used as an input for training NER model 510. The identification information data set includes a plurality of key-value pairs composed of reference documents 112 and identification information determined in reference documents 112. NER model 510 may be trained by minimizing a difference between identification information 520 predicted by NER model 510 and the determined identification information in identification information data set 150 through iterative learning. After the training is completed, NER model 510 is output 505 as the trained NER model 540.

In one or more embodiments, the generated identification information data set 150 may also be combined with a general data set to train NER model 510. Documents in the general data set may include at least one word manually determined as identification information. For example, the general data set includes documents manually labeled with identification information. The general data set may include CoNLL 2003, OntoNotes 5.0/CoNLL 2012, I2b2 Challenges, and the like as described above. When the objects are individuals, a part of labels in the general data set may be reclassified as PII or non-PII, or a probability of belonging to PII. Since the words in the generated identification information data set 150 may be determined as PII or non-PII, or the probability of belonging to PII, by using the generated identification information data set 150 to expand the general data set to train the NER model, the need for manually labeling the general data set may be reduced. In the meantime, the generated identification information data set 150 contains information regarding direct PII and indirect PII, so the capability of determining indirect PII in a target document through the trained NER model may be improved. The scope of the present disclosure is not limited in terms of architecture and training details of NER model 510.

Continuing to describe inference stage 502 of determining the identification information in target document 530 by using the trained NER model 540 with reference to FIG. 5, in the case where the objects are individuals, examples of target document 530 may include medical records, resumes, and the like. For another example, target document 530 may be a diary published by a user on the Internet, and the content of the diary describes the user's activities on the day of his birthday. After the training of NER model 510 is completed, the trained NER model can be used to determine PII in target document 530. Similarly, the completion of training may indicate that the performance of NER model 510 on the training data set exceeds a threshold. After the training is completed, target document 530 may be input to the trained NER model 540. The trained NER model 540 may determine PII in target document 530 according to the knowledge about the PII learned during training. For example, the trained NER model 540 may determine the birthday date and the user's activity track recorded in the above-mentioned diary as PII, and determine the birthday wish recorded in the diary of the user as non-PII.

In this way, identification information in target document 130 may be determined by using NER model 540 trained by identification information data set 150 according to the embodiments of the present disclosure. In the case where the objects are individuals, since identification information data set 150 including the direct PII and the indirect PII is used to train NER model 540, the trained NER model 540 may determine the indirect PII in target document 130. Therefore, the trained NER model 540 according to the embodiments of the present disclosure may sufficiently determine the direct PII and the indirect PII in target document 130, thereby reducing the risk of target document 130 being re-identified after the determined PII is removed.

Figure 6:
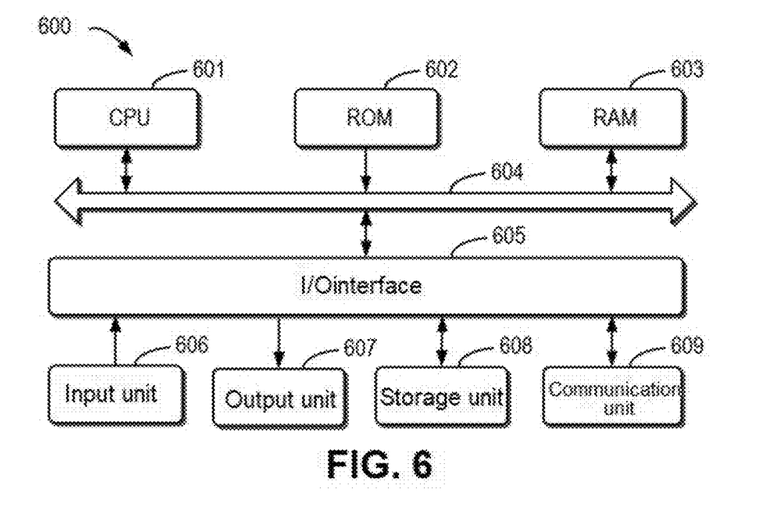
FIG. 6 shows a block diagram of an example computing device that may be configured to implement one or more embodiments of the present disclosure.

FIG. 6 shows a schematic block diagram of example device 600 that may be configured to implement one or more embodiments of the present disclosure. For example, computing device 120 as shown in FIG. 1 may be implemented by device 600. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disk; and communication unit 609, such as a network card, a modem, and a wireless communication transceiver. Communication unit 609 allows device 600 to exchange information/data with other devices over a computer network such as an Internet and/or various telecommunication networks.

Various processes and processing described above, for example, method 200, may be performed by processing unit 601. For example, in one or more embodiments, method 200 may be implemented as a computer software program that is tangibly included in a machine-readable medium such as storage unit 608. In one or more embodiments, part or all of the computer program may be loaded and/or installed onto device 600 via ROM 602 and/or communication unit 609. When the computer program is loaded to RAM 603 and executed by CPU 601, one or more actions of method 200 described above may be executed.

Embodiments of the present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in any combination of one or more programming languages, including object oriented programming languages, such as Smalltalk, C++, and the like, and conventional procedural programming languages, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In the case where a remote computer is involved, the remote computer may be connected to a user computer over any kind of networks, including a local area network (LAN) or a wide area network (WAN), or may be connected to an external computer (e.g., connected over the Internet using an Internet service provider). In one or more embodiments, an electronic circuit, for example, a programmable logic circuit, a field programmable gate array (FPGA), or a programmable logic array (PLA), is personalized by utilizing state information of the computer-readable program instructions, wherein the electronic circuit may execute computer-readable program instructions so as to implement various aspects of the present disclosure.

Various aspects of the present disclosure are described herein with reference to flowcharts and/or block diagrams of the method, the apparatus (system), and the computer program product according to the embodiments of the present disclosure. It should be understood that each block in the flowcharts and/or block diagrams as well as a combination of blocks in the flowcharts and/or block diagrams may be implemented using computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the accompanying drawings illustrate the architectures, functions, and operations of possible implementations of systems, methods, and computer program products according to multiple embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented by using a special hardware-based system for executing specified functions or actions or by a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or the improvements to technologies on the market, or to enable other persons of ordinary skill in the art to understand the embodiments disclosed herein.

The invention claimed is:

1. A method for processing data, comprising:
    training a classification model based on a plurality of reference documents describing different objects and a plurality of object identifiers associated with the different objects to obtain a trained classification model, wherein the object identifiers comprise at least one selected from a group consisting of an organization name, an organization code, and personal identifiers, wherein the trained classification model respectively associating the plurality of reference documents with the described objects, wherein the plurality of reference documents comprises at least one of the following:
    biographies, medical records, criminal records, historical information of a company, resumes, and bills; and
    based on contributions of individual words in the plurality of reference documents to the association, determining, from the individual words, identification information that can identify the objects, wherein the identification information is used to determine personally identifiable information associated with at least one of the described objects, wherein the identification information is further used to automatically generate an identification information data set without manually labeling the identification information, wherein the identification information data set comprises at least a portion of the plurality of reference documents.

2. The method according to claim 1, wherein determining from the individual words the identification information that can identify the objects comprises:
    determining weights assigned to the individual words by the trained classification model, the weights indicating the contributions; and
    determining words having the weights exceeding a threshold in the individual words as the identification information.

3. The method according to claim 1, further comprising:
    composing the plurality of reference documents that comprise the identification information into the identification information data set,
    using the identification information data set to train a named entity recognition (NER) model, and
    using the trained NER model to determine identification information in a target document based on the respective features of a plurality of extents and the association.

4. The method according to claim 3, wherein the identification information data set is combined with a general data set to train the NER model, and wherein a document in the general data set comprises at least one word that is manually determined as identification information.

5. The method according to claim 3, wherein the NER model is a long-short term memory model using a conditional random field.

6. The method according to claim 1, wherein the classification model is a hierarchical attention network.

7. An electronic device, comprising:
    a processor; and
    a memory coupled to the processor, the memory having instructions stored therein, and the instructions, when executed by the processor, causing the device to execute actions comprising:
    training a classification model based on a plurality of reference documents describing different objects and a plurality of object identifiers associated with the different objects to obtain a trained classification model, wherein the object identifiers comprise at least one selected from a group consisting of an organization name, an organization code, and personal identifiers, wherein the trained classification model respectively associating the plurality of reference documents with the described objects, wherein the plurality of reference documents comprises at least one of the following:
    biographies, medical records, criminal records, historical information of a company, resumes, and bills; and
    based on contributions of individual words in the plurality of reference documents to the association, determining from the individual words identification information that can identify the objects, wherein the identification information is used to determine personally identifiable information associated with at least one of the described objects, wherein the identification information is further used to automatically generate an identification information data set without manually labeling the identification information, wherein the identification information data set comprises at least a portion of the plurality of reference documents.

8. The device according to claim 7, wherein determining from the individual words the identification information that can identify the objects comprises:

determining weights assigned to the individual words by the trained classification model, the weights indicating the contributions; and determining words having the weights exceeding a threshold in the individual words as the identification information.

9. The device according to claim 7, wherein the actions further comprise:

composing the plurality of reference documents that comprise the identification information into the identification information data set, using the identification information data set to train a named entity recognition (NER) model, and using the trained NER model to determine identification information in a target document.

10. The device according to claim 9, wherein the identification information data set is combined with a general data set to train the NER model, and wherein a document in the general data set comprises at least one word that is manually determined as identification information.

11. The device according to claim 9, wherein the NER model is a long-short term memory model using a conditional random field.

12. The device according to claim 7, wherein the classification model is a hierarchical attention network.

13. A non-transitory computer readable medium comprising computer readable program code, which when executed by a computer processor enables the computer processor to perform a method for processing data, the method comprising:

training a classification model based on a plurality of reference documents describing different objects and a plurality of object identifiers associated with the different objects to obtain a trained classification model, wherein the object identifiers comprise at least one selected from a group consisting of an organization name, an organization code, and personal identifiers, wherein the trained classification model respectively associating the plurality of reference documents with the described objects, wherein the plurality of reference documents comprises at least one of the following:

biographies, medical records, criminal records, historical information of a company, resumes, and bills; and based on contributions of individual words in the plurality of reference documents to the association, determining, from the individual words, identification information that can identify the objects, wherein the identification information is used to determine personally identifiable information associated with at least one of the described objects, wherein the identification information is further used to automatically generate an identification information data set without manually labeling the identification information, wherein the identification information data set comprises at least a portion of the plurality of reference documents.

14. The non-transitory computer readable medium of claim 13, wherein determining from the individual words the identification information that can identify the objects comprises:

determining weights assigned to the individual words by the trained classification model, the weights indicating the contributions; and determining words having the weights exceeding a threshold in the individual words as the identification information.

15. The non-transitory computer readable medium of claim 13, further comprising:

composing the plurality of reference documents that comprise the identification information into the identification information data set, using the identification information data set to train a named entity recognition (NER) model, and using the trained NER model to determine identification information in a target document based on the respective features of a plurality of extents and the association.

16. The non-transitory computer readable medium of claim 15, wherein the identification information data set is combined with a general data set to train the NER model, and wherein a document in the general data set comprises at least one word that is manually determined as identification information.

17. The non-transitory computer readable medium of claim 16, wherein the NER model is a long-short term memory model using a conditional random field.

18. The non-transitory computer readable medium of claim 15, wherein the NER model is a long-short term memory model using a conditional random field.

* * * * *